US012655889B2

(12) United States Patent
Kim et al.

(10) Patent No.: US 12,655,889 B2
(45) Date of Patent: Jun. 16, 2026

(54) POWER TRAIN DEVICE FOR ELECTRIC VEHICLE

(71) Applicant: Hyundai Transys Inc., Seosan-si (KR)

(72) Inventors: Jin Hoon Kim, Hwaseong-si (KR);
Kangmun Kim, Hwaseong-si (KR);
Won Kim, Hwaseong-si (KR); **Taewoo
Kim, Hwaseong-si (KR); Tae Hyung
Kim, Hwaseong-si (KR); Soo Han Lee**,
Hwaseong-si (KR); Keeyun Jung,
Hwaseong-si (KR); Jae Woong Cha,
Hwaseong-si (KR)

(73) Assignee: Hyundai Transys Inc., Seosan-si (KR)

( * ) Notice: Subject to any disclaimer, the term of this
patent is extended or adjusted under 35
U.S.C. 154(b) by 0 days.

(21) Appl. No.: 19/187,236

(22) Filed: Apr. 23, 2025

(65) Prior Publication Data

US 2026/0036188 A1     Feb. 5, 2026

(30) Foreign Application Priority Data

Aug. 1, 2024     (KR) ........................ 10-2024-0102553
Oct. 21, 2024     (KR) ........................ 10-2024-0144287

(51) Int. Cl.
*F16H 3/64*     (2006.01)
*F16D 11/16*     (2006.01)
*F16H 63/04*     (2006.01)
(52) U.S. Cl.
CPC .............. *F16H 3/64* (2013.01); *F16H 63/04*
(2013.01); *F16D 11/16* (2013.01); *F16H
2200/0021* (2013.01); *F16H 2200/0034*
(2013.01); *F16H 2200/201* (2013.01); *F16H
2200/2094* (2013.01); *F16H 2200/2097*
(2013.01)
(58) Field of Classification Search
CPC ........ F16H 2200/2005–201; F16H 2200/2097;
F16H 2200/2064; F16H 2200/2094; F16H
3/64; F16H 2003/442; F16H 48/10–48/11;
F16D 11/04; F16D 11/10; F16D 11/16;
F16D 2011/002–004
See application file for complete search history.

(56) References Cited

U.S. PATENT DOCUMENTS 6,022,289 A     2/2000 Francis
9,714,692 B2 * 7/2017 Kim ........................ F16H 3/666
(Continued)

FOREIGN PATENT DOCUMENTS

CN     103754111 A     4/2014
CN     208831614 U     5/2019
(Continued)

*Primary Examiner* — Ernesto A Suarez
*Assistant Examiner* — Lillian T Nguyen
(74) *Attorney, Agent, or Firm* — Bridgeway IP Law
Group, PLLC; Jihun Kim

(57) ABSTRACT

A power train device for an electric vehicle includes a first
planetary gear set including a first sun gear, a first ring gear,
a first planet gear, and a first carrier, a second planetary gear
set including a second sun gear, a second ring gear, a second
planet gear, and a second carrier, a third planetary gear set
including a third ring gear, a third planet gear, and a third
carrier, and a sleeve having an inner-diameter portion on
which a first engagement part is provided, the first engage-
ment part being configured to engage, at ordinary times,
with a third engagement part provided on the first ring gear.

4 Claims, 7 Drawing Sheets

(A)     (B)     (C)

(56)                    References Cited

U.S. PATENT DOCUMENTS

| | | | | |
|---|---|---|---|---|
| 11,892,063 B2 * | 2/2024 | Höhn | .................... | F16D 21/04 |
| 2014/0315679 A1 * | 10/2014 | Xu | ....................... | F16H 57/08 |
| | | | | 475/331 |
| 2016/0003351 A1 * | 1/2016 | Park | .................. | F16H 61/0213 |
| | | | | 475/153 |
| 2019/0299766 A1 * | 10/2019 | Takada | ................ | B60W 20/40 |
| 2020/0096083 A1 * | 3/2020 | Waltz | ...................... | B60K 1/02 |
| 2022/0205520 A1 | 6/2022 | Beck et al. | | |
| 2022/0355663 A1 * | 11/2022 | Beck | ..................... | B60K 23/04 |
| 2023/0102032 A1 | 3/2023 | Friedrichshafen | | |

FOREIGN PATENT DOCUMENTS

| | | | |
|---|---|---|---|
| CN | 113119702 A | 7/2021 | |
| JP | H01261541 A | 10/1989 | |
| KR | 10-2007-0076773 A | 7/2007 | |
| KR | 10-2020-0001782 A | 1/2020 | |
| KR | 10-2023-0112545 A | 7/2023 | |

* cited by examiner

POWER TRAIN DEVICE FOR ELECTRIC VEHICLE

CROSS-REFERENCE TO RELATED APPLICATIONS

This application claims priority to and the benefit of Korean Patent Application No. 10-2024-0102553, and 10-2024-0144287 filed in the Korean Intellectual Property Office on Aug. 1, 2024, and Oct. 21, 2024, the entire contents of which are incorporated herein by reference.

TECHNICAL FIELD

The present disclosure relates to a power train device for an electric vehicle.

BACKGROUND ART

There is a growing demand for commercial electric vehicles (fuel cell electric vehicles) such as freight transportation trucks or buses to meet exhaust gas regulations and reduce the amount of use of fossil energy.

In the electric vehicle, power of a drive motor may be transmitted to a driving wheel via a speed reducer and an axle.

Power electric (PE) systems for an electric vehicle in the related art may be classified into a central motor type system configured to receive power from a drive motor and transmit the power to an axle through a speed reduction device, and an electric axle (E-axle) type system including a drive motor, a speed reduction device, and a differential device of an axle.

Because the electric vehicle in the related art requires an increased space to ensure an installation space for a battery pack in comparison with an internal combustion engine vehicle, the power electric (PE) system including a motor, an inverter, and a speed reducer needs to be more compact.

However, because of the characteristics of a power train layout of the electric axle (E-axle) of the electric vehicle in the related art, it is difficult to satisfy the required performance of the electric vehicle by using a single-stage speed reducer. Furthermore, in case that a high-performance drive motor is applied, there is a problem in that the drive motor occupies a large mounting space, and costs are increased.

DOCUMENT OF RELATED ART

Patent Document (Patent Document 1) Korean Patent Application Laid-Open No. 10-2007-0076773 (published on Jul. 25, 2007)

SUMMARY OF THE DISCLOSURE

The present disclosure has been made in an effort to solve the above-mentioned problem, and an object of the present disclosure is to provide a power train device for an electric vehicle in which a speed reduction structure including a plurality of planetary gear sets makes it easy to mount a package of a vehicle.

In order to achieve the above-mentioned object, the present disclosure provides a power train device for an electric vehicle, the power train device including: a first planetary gear set including a first sun gear coupled to an input shaft connected to a drive motor, a first ring gear surrounding the first sun gear, a first planet gear configured to engage with the first sun gear and the first ring gear between the first sun gear and the first ring gear, and a first carrier configured to support the first planet gear so that the first planet gear is rotatable; and a sleeve having an inner-diameter portion having a first engagement part thereon, the first engagement part being configured to engage with a third engagement part disposed on an outer-diameter portion of the first ring gear, the first engagement part further being configured to move along an axial direction of the input shaft while engaging with the third engagement part toward a casing to implement a first shift operation for a first speed range or toward the first carrier to implement a second shift operation for a second speed range.

In addition, the power train device may further include: a second planetary gear set comprising a second sun gear connected in power to the first carrier, a second ring gear surrounding the second sun gear, a second planet gear configured to engage with the second sun gear and the second ring gear between the second sun gear and the second ring gear, and a second carrier configured to support the second planet gear so that the second planet gear is rotatable; and a third planetary gear set comprising a third ring gear surrounding the second ring gear, a third planet gear configured to engage with the second ring gear and the third ring gear between the second ring gear and the third ring gear, and a third carrier configured to support the third planet gear so that the third planet gear is rotatable.

In addition, the first planetary gear set, the second planetary gear set, and the third planetary gear set may be mounted in the casing.

In addition, a second engagement part may be disposed on an outer-diameter portion of the sleeve, and a fifth engagement part may be disposed on an outer-diameter portion of the first carrier (first embodiment).

In addition, during the first shift operation, the sleeve may be configured to move in a first shift direction, such that the second engagement part engages with a fourth engagement part in the casing while the first engagement part engages with the third engagement part (first embodiment).

In addition, during the second shift operation, the sleeve may be configured to move in a second shift direction, such that the first engagement part engages with the fifth engagement part while engaging with the third engagement part, and the second engagement part disengages from the fourth engagement part (first embodiment).

In addition, the first engagement part and the third and fifth engagement parts may have first spline teeth of internal gears, and the second engagement part and the fourth engagement part may have second spline teeth of internal gears (first embodiment).

In addition, a second engagement part may be disposed on one surface of the sleeve, a fifth engagement part may be disposed on one surface of the first carrier, and a sixth engagement part may be disposed on another surface of the sleeve facing the fifth engagement part (second embodiment).

In addition, during the first shift operation, the sleeve may be configured to move in a first shift direction, such that the second engagement part engages with a fourth engagement part in the casing while the first engagement part engages with the third engagement part (second embodiment).

In addition, during the second shift operation, the sleeve may be configured to move in a second shift direction, such that the second engagement part disengages from the fourth engagement part and the sixth engagement part engages with the fifth engagement part while the first engagement part engages with the third engagement part (second embodiment).

In addition, the first engagement part and the third engagement part may have third spline teeth of internal gears, the second engagement part and the fourth engagement part may have first radial dog-type teeth facing one another, and the fifth engagement part and the sixth engagement part may have second radial dog-type teeth facing one another (second embodiment).

In addition, a fifth engagement part may be disposed on an outer-diameter portion of the first carrier, and a fourth engagement part may be disposed in the casing (third embodiment).

In addition, during the first shift operation, the sleeve may be configured to move in a first shift direction, such that the first engagement part engages with the fourth engagement part while engaging with the third engagement part (third embodiment).

In addition, during the second shift operation, the sleeve may be configured to move in a second shift direction, such that the first engagement part engages with the fifth engagement part while engaging with the third engagement part (third embodiment).

In addition, the first, fourth, and fifth engagement parts may have fourth spline teeth of internal gears (third embodiment).

In addition, the second planet gear may include a plurality of second planet gears and the third planet gear may include a plurality of third planet gears, and a number of the plurality of second planet gears may exceed a number of the plurality of third planet gears.

In addition, the second planet gear may include six second planet gears arranged along an outer-diameter portion of the second sun gear, and the third planet gear may include five third planet gears arranged along an outer-diameter portion of the second ring gear.

In addition, the third carrier may be fixed to the casing.

In addition, the second carrier may be configured to transmit power transmitted to the second carrier to one side axle shaft via an inter-shaft, and the third ring gear may be configured to transmit power transmitted to the third ring gear to an other side axle shaft.

In addition, the power train device may further include a controller, and the sleeve may be movable, by the controller, in a first shift direction toward the casing to implement the first shift operation or a second shift direction toward the first carrier to implement the second shift operation.

According to the present disclosure, the speed reduction structure including the plurality of planetary gear sets may make it easy to mount the package of the vehicle.

In addition, according to the present disclosure, the first and second shift operations may be performed, which may control a low-speed vehicle speed and a high-speed vehicle speed.

In addition, according to the present disclosure, the plurality of planetary gear sets are provided, such that the plurality of planetary gear sets do not occupy a large space when being mounted in the vehicle.

In addition, according to the present disclosure, the shift operation may be controlled by the operation of the sleeve.

In addition, according to the present disclosure, the number of components may be reduced, such that costs and weight may be reduced, and the assembling process may be simplified, in comparison with a power train device for an electric vehicle in the related art.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
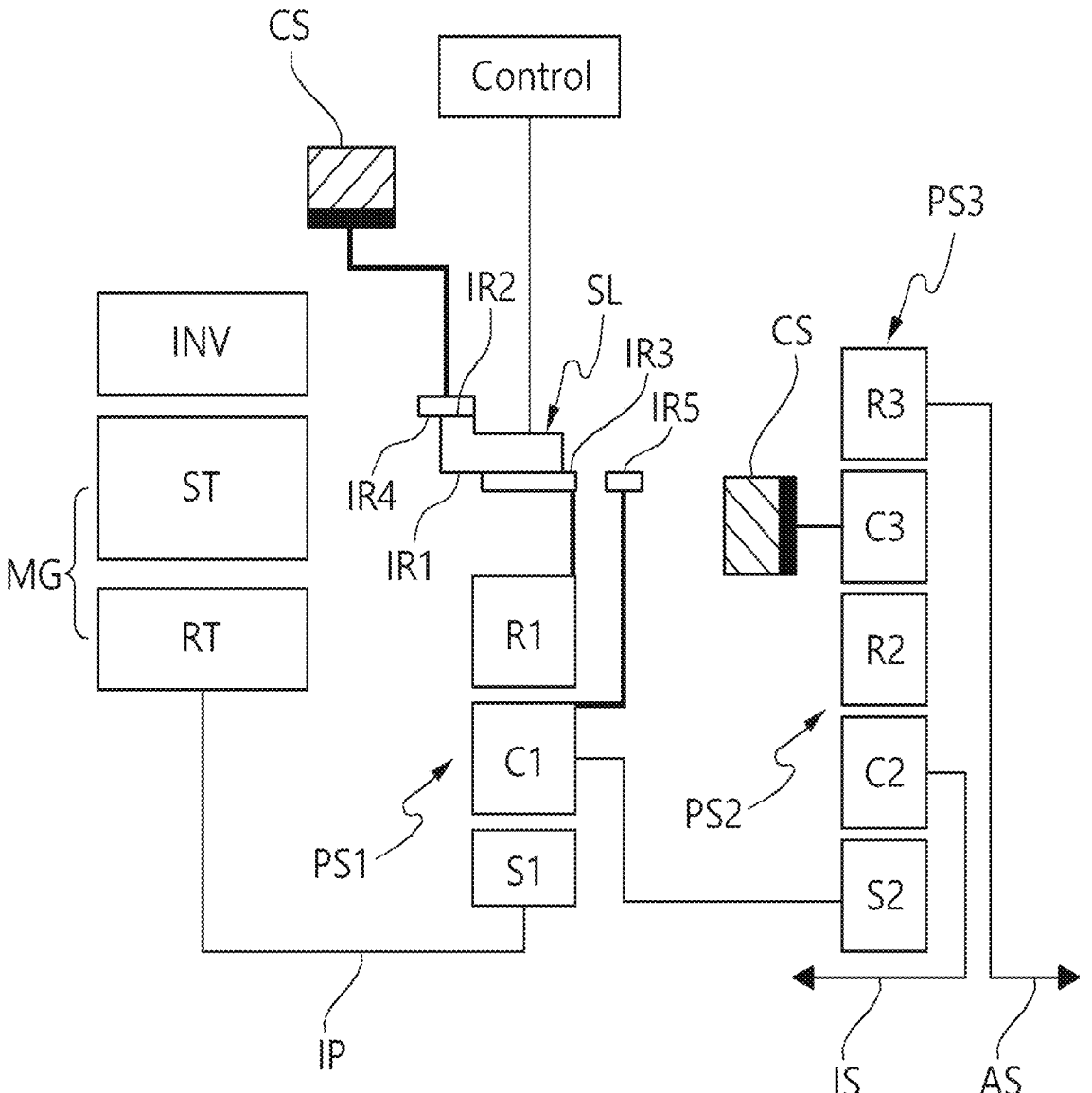
FIG. 1 is a view illustrating an operation in a first shift position according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present disclosure, the specific descriptions of publicly known related configurations or functions will be omitted when it is determined that the specific descriptions may obscure the subject matter of the present disclosure. Further, the exemplary embodiments of the present disclosure will be described below, but the technical spirit of the present disclosure is not limited thereto and may, of course, be modified and variously carried out by those skilled in the art.

Figure 2:
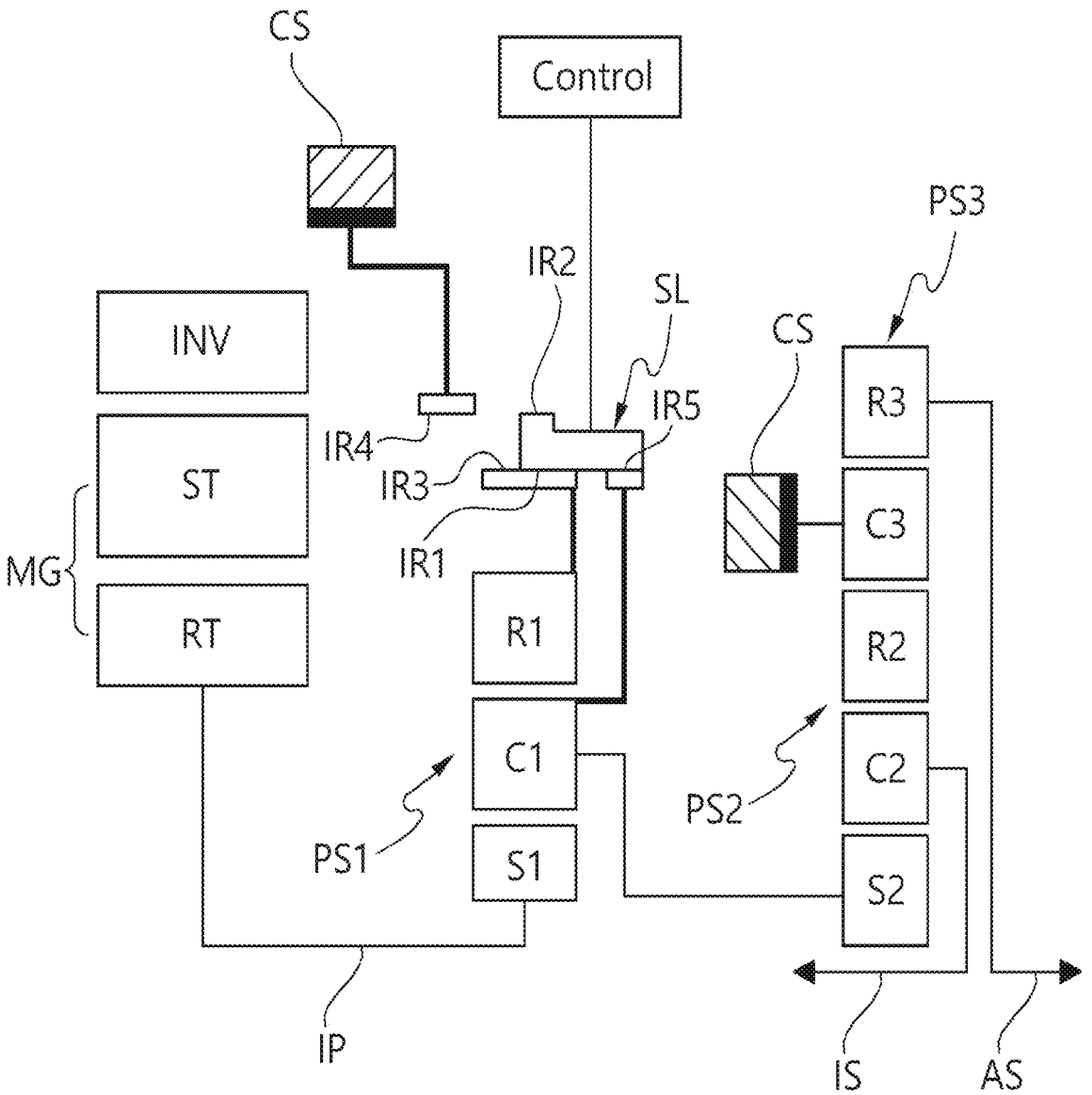
FIG. 2 is a view illustrating an operation in a second shift position according to the exemplary embodiment of the present disclosure.
Figure 3:
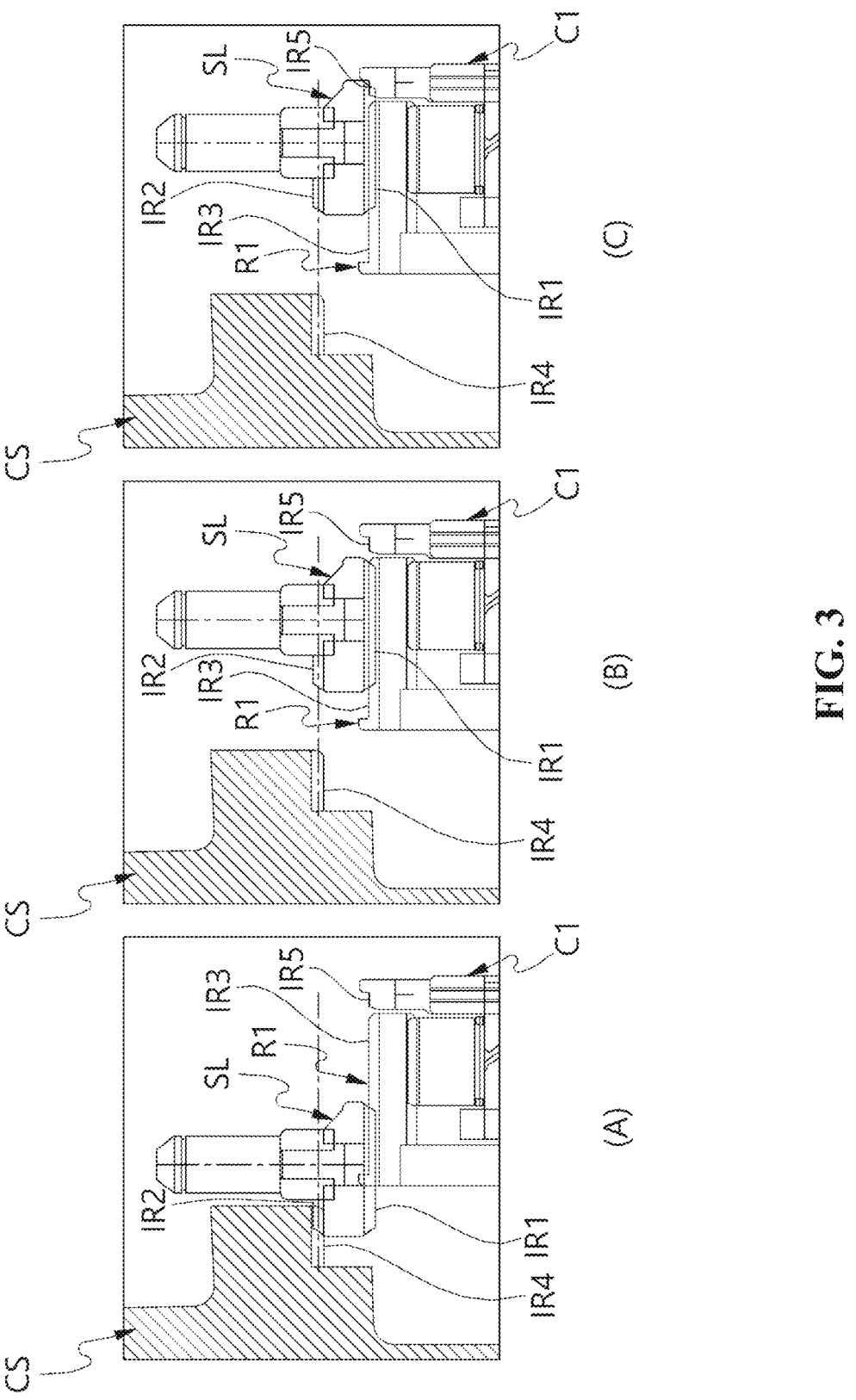
FIG. 3 is a view illustrating operations of a sleeve in a first shift position, an N-shift position, and a second shift position according to a first embodiment of the present disclosure.
Figure 4:
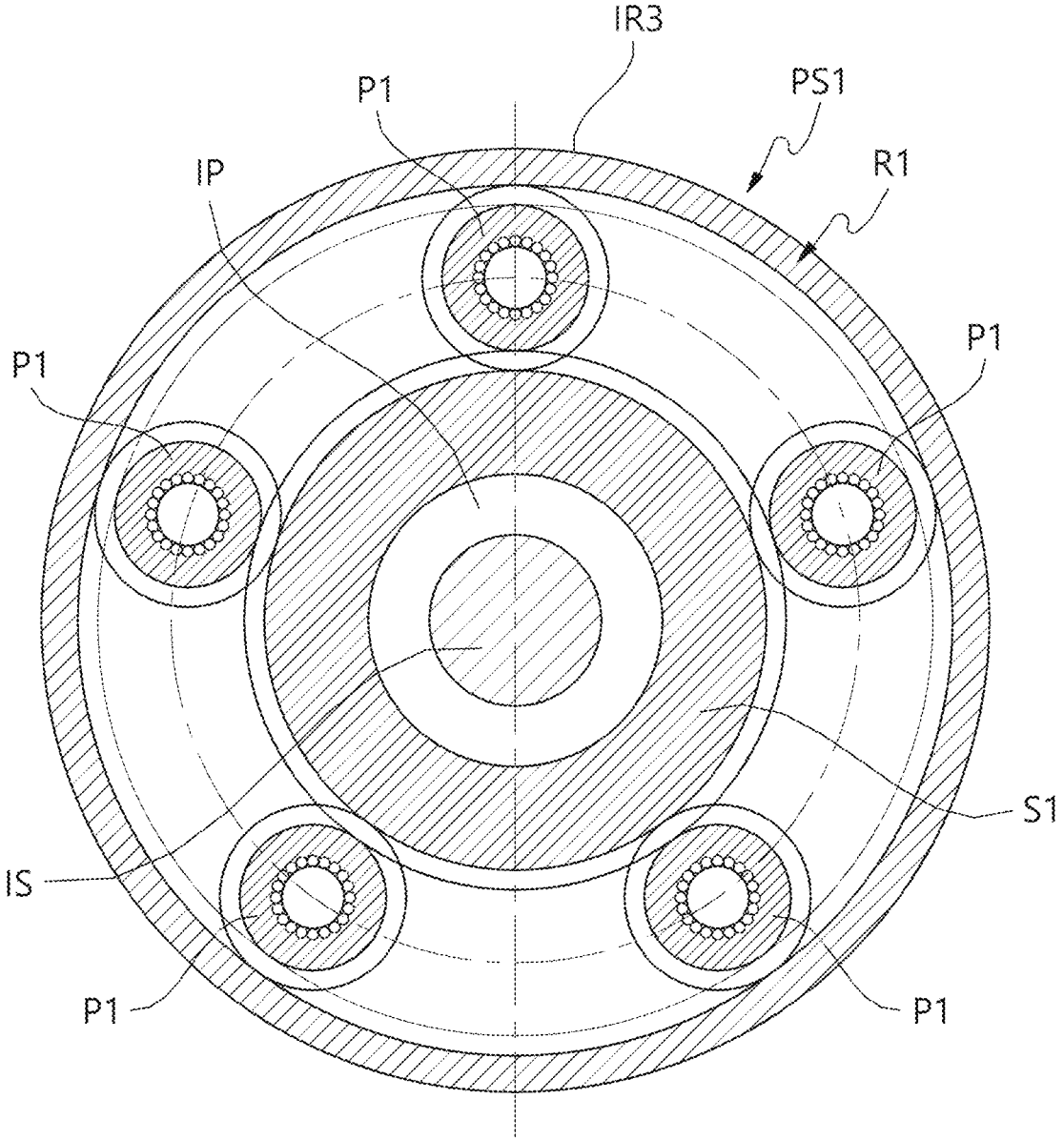
FIG. 4 is a view illustrating a first planetary gear set according to the exemplary embodiment of the present disclosure.
Figure 5:
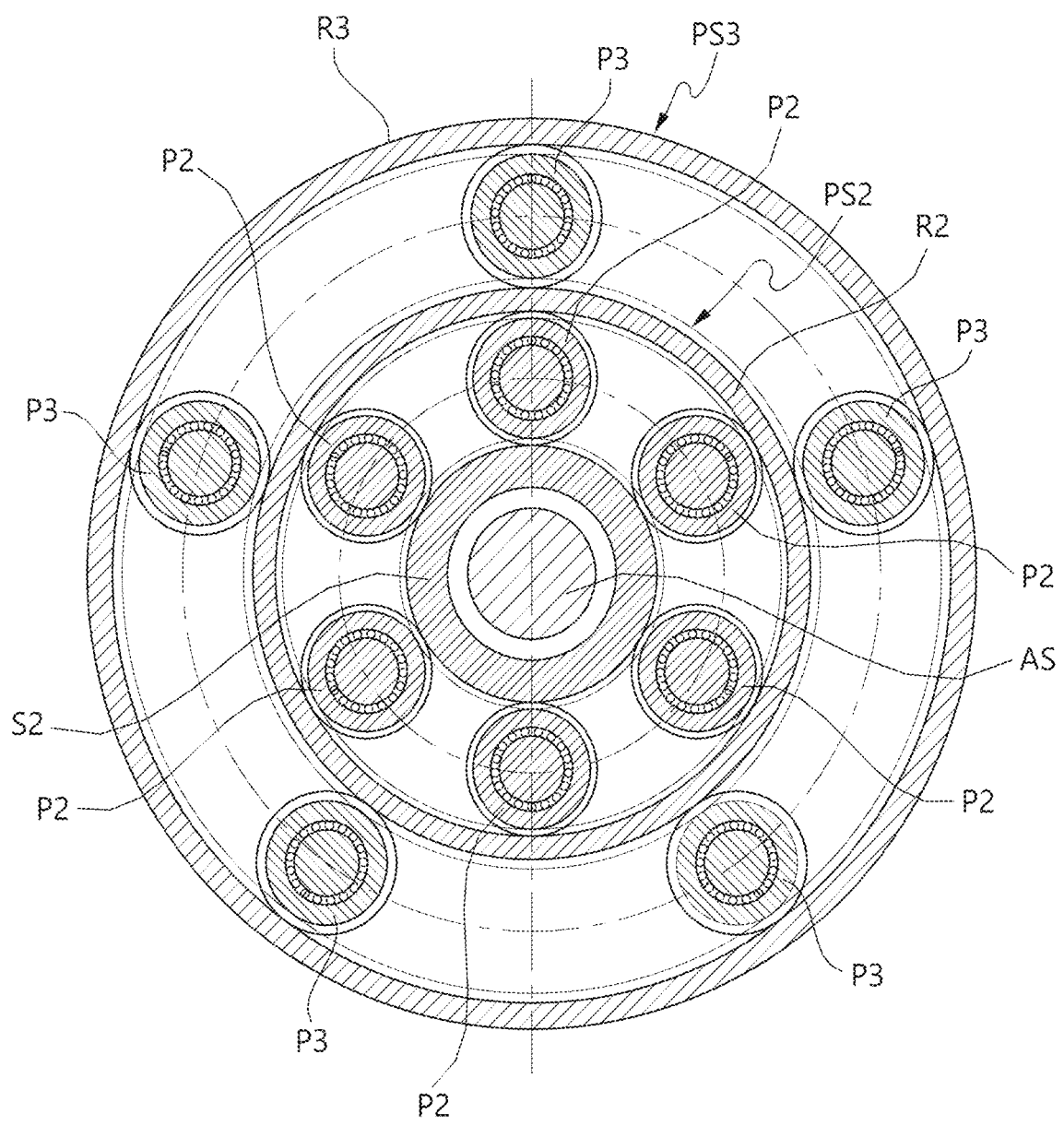
FIG. 5 is a view illustrating second and third planetary gear sets according to the exemplary embodiment of the present disclosure.

FIG. 1 is a view illustrating an operation in a first shift position according to an exemplary embodiment of the present disclosure, FIG. 2 is a view illustrating an operation in a second shift position according to the exemplary embodiment of the present disclosure, FIG. 3 is a view illustrating operations of a sleeve in a first shift position, an N-shift position, and a second shift position according to a first embodiment of the present disclosure, FIG. 4 is a view illustrating a first planetary gear set according to the exemplary embodiment of the present disclosure, and FIG. 5 is a view illustrating second and third planetary gear sets according to the exemplary embodiment of the present disclosure.

As illustrated in FIGS. 1 to 5, a power train device of the present disclosure may include a first planetary gear set PS1 connected in power to a drive motor M G, a second planetary gear set PS2 connected in power to the first planetary gear set PS1, a third planetary gear set PS3 connected in power to the second planetary gear set PS2, and a sleeve SL configured to perform a first shift operation or a second shift operation while moving in an axial direction.

The drive motor MG may include a stator ST and a rotor RT. The drive motor MG may be connected to an inverter INV.

The first planetary gear set PS1, the second planetary gear set PS2, the third planetary gear set PS3, and the sleeve SL may be mounted in a casing CS.

The first planetary gear set PS1 may include a first sun gear S1, first planet gears P1, a first carrier C1, and a first ring gear R1.

The first sun gear S1 may be mounted on an outer-diameter portion of an input shaft IP connected to the drive motor MG. The first sun gear S1 may be positioned in the first ring gear R1.

The first ring gear R1 may be configured to surround the first sun gear S1.

The first planet gears P1 may simultaneously engage with the first sun gear S1 and the first ring gear R1 between the first sun gear S1 and the first ring gear R1. The first planet gears P1 may be provided as a plurality of first planet gears P1 arranged along an outer-diameter portion of the first sun gear S1. For example, five first planet gears P1 may be arranged along the outer-diameter portion of the first sun gear S1.

The first carrier C1 may be integrated with the first planet gear P1. The first planet gear P1 may rotate in a state in which the first planet gear P1 is supported on the first carrier C1.

The second planetary gear set PS2 may include a second sun gear S2, second planet gears P2, a second carrier C2, and a second ring gear R2.

The second sun gear S2 may be connected in power to the first carrier C1. The second sun gear S2 may be positioned in the second ring gear R2.

The second ring gear R2 may be configured to surround the second sun gear S2. The second ring gear R2 may serve as the ring gear of the second planetary gear set PS2 and serve as the sun gear of the third planetary gear set PS3.

The second planet gears P2 may simultaneously engage with the second sun gear S2 and the second ring gear R2 between the second sun gear S2 and the second ring gear R2. The second planet gears P2 may be provided as a plurality of second planet gears P2 arranged along an outer-diameter portion of the second sun gear S2. For example, six second planet gears P2 may be arranged along the outer-diameter portion of the second sun gear S2.

The second carrier C2 may be integrated with the second planet gear P2. The second planet gear P2 may rotate in a state in which the second planet gear P2 is supported on the second carrier C2. One side of the second carrier C2 may be connected to an inter-shaft IS. The inter-shaft IS may be connected to one side axle shaft (not illustrated).

The third planetary gear set PS3 may include third planet gears P3, a third carrier C3, and a third ring gear R3.

The third ring gear R3 may be configured to surround the second ring gear R2. The third planet gears P3 may simultaneously engage with the second ring gear R2 and the third ring gear R3 between the second ring gear R2 and the third ring gear R3. The third planet gears P3 may be provided as a plurality of third planet gears P3 arranged along an outer-diameter portion of the second ring gear R2. For example, five third planet gears P3 may be arranged along the outer-diameter portion of the second ring gear R2.

The third carrier C3 may be integrated with the third planet gear P3. The third planet gear P3 may rotate in a state in which the third planet gear P3 is supported on the third carrier C3. The third carrier C3 may be fixed to the casing CS.

One side of the third ring gear R3 may be connected to the other side axle shaft AS. The inter-shaft IS and the other side axle shaft AS may be configured to be opposite to each other at two opposite sides. For example, the inter-shaft IS may be configured to penetrate the inside of the input shaft IP.

The sleeve SL, which performs the shift operation, may include a first engagement part IR1 and a second engagement part IR2. The first engagement part IR1 may be provided on an inner-diameter portion of the sleeve SL. The second engagement part IR2 may be provided on an outer-diameter portion of the sleeve SL. The first engagement part IR1 and the second engagement part IR2 may be configured as splines. The first engagement part IR1 may engage, at ordinary times, with a third engagement part IR3 provided on an outer-diameter portion of the first ring gear R1.

During the first shift operation, the sleeve SL moves in a first shift direction, such that the second engagement part IR2 may engage with a fourth engagement part IR4 provided in the casing CS. The engagement state between the first engagement part IR1 and the third engagement part IR3 may be maintained in an intact manner even though the sleeve SL moves in the first shift direction (see FIG. 3A).

During an N-shift (neutral-shift) operation, the sleeve SL moves in an N-shift direction, such that the second engagement part IR2 may disengage from the fourth engagement part IR4. The engagement state between the first engagement part IR1 and the third engagement part IR3 may be maintained in an intact manner even though the sleeve SL moves in the N-shift direction (see FIG. 3B).

During the second shift operation, the sleeve SL moves in a second shift direction, such that the first engagement part IR1 may simultaneously engage with the third engagement part IR3 and a fifth engagement part IR5 provided on an outer-diameter portion of the first carrier C1. The second engagement part IR2 and the fourth engagement part IR4 may disengage when the sleeve SL moves in the second shift direction (see FIG. 3C).

During the first shift operation, the first ring gear R1 is fixed so that the first ring gear R1 cannot rotate. During the second shift operation, the first ring gear R1 may be unfixed, such that the first ring gear R1 may rotate integrally with the first carrier C1. The first carrier C1 may be connected in power to the second sun gear S2, and the first carrier C1 and the second sun gear S2 may always rotate integrally.

As illustrated in FIG. 3, the first engagement part IR1 and the third and fifth engagement parts IR3 and IR5 may have spline teeth of internal gears. The second engagement part IR2 and the fourth engagement part IR4 may have spline teeth of internal gears.

As illustrated in FIGS. 1 to 3, the operation of the sleeve SL may be controlled by a controller Control. The sleeve SL may be moved in the first shift direction or the second shift direction by an operation of the controller Control. For example, the controller Control may be an actuator.

Figure 6:
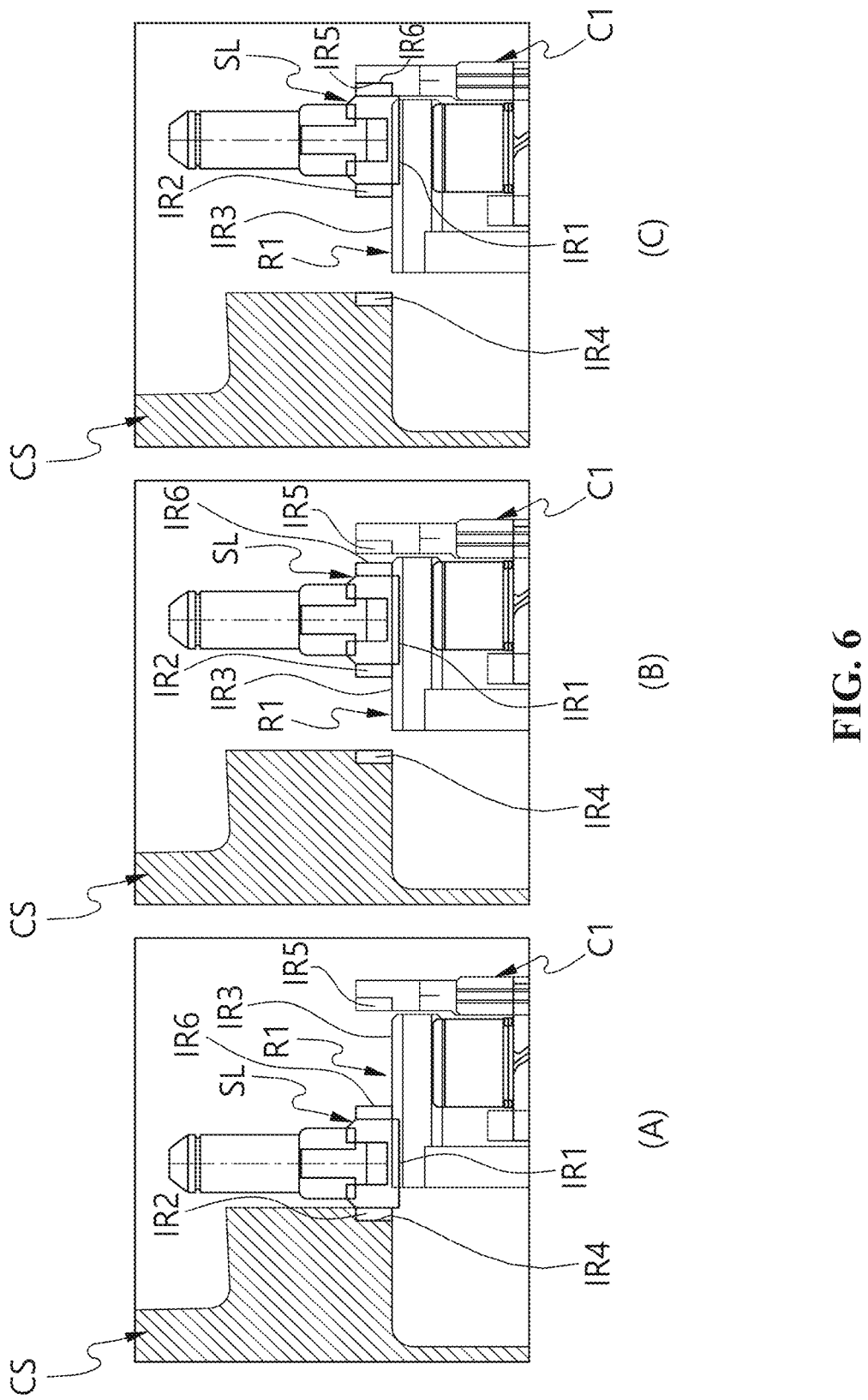
FIG. 6 is a view illustrating operations of a sleeve in a first shift position, an N-shift position, and a second shift position according to a second embodiment of the present disclosure.

FIG. 6 is a view illustrating the operations of the sleeve in a first shift position, an N-shift position, and a second shift position according to a second embodiment of the present disclosure.

As illustrated in FIG. 6, the second embodiment of the present disclosure may be identical in configuration to the first embodiment, except for the engagement parts.

The second engagement part IR2 may be provided on one surface of the sleeve SL. The fifth engagement part IR5 may be provided on one surface of the first carrier C1. A sixth engagement part IR6 may be provided on another surface of the sleeve SL opposite to the fifth engagement part IR5.

The first engagement part IR1 and the third engagement part IR3 may have spline teeth of internal gears. The teeth of the first and third engagement parts IR1 and IR3 may be formed at predetermined intervals and have quadrangular or trapezoidal shapes.

The second engagement part IR2 and the fourth engagement part IR4 may have radial dog-type teeth facing one another. The teeth of the second and fourth engagement parts IR2 and IR4 may be formed at predetermined intervals and have quadrangular or trapezoidal shapes.

The fifth engagement part IR5 and the sixth engagement part IR6 may have radial dog-type teeth facing one another. The teeth of the fifth and sixth engagement parts IR5 and IR6 may be formed at predetermined intervals and have quadrangular or trapezoidal shapes.

Figure 7:
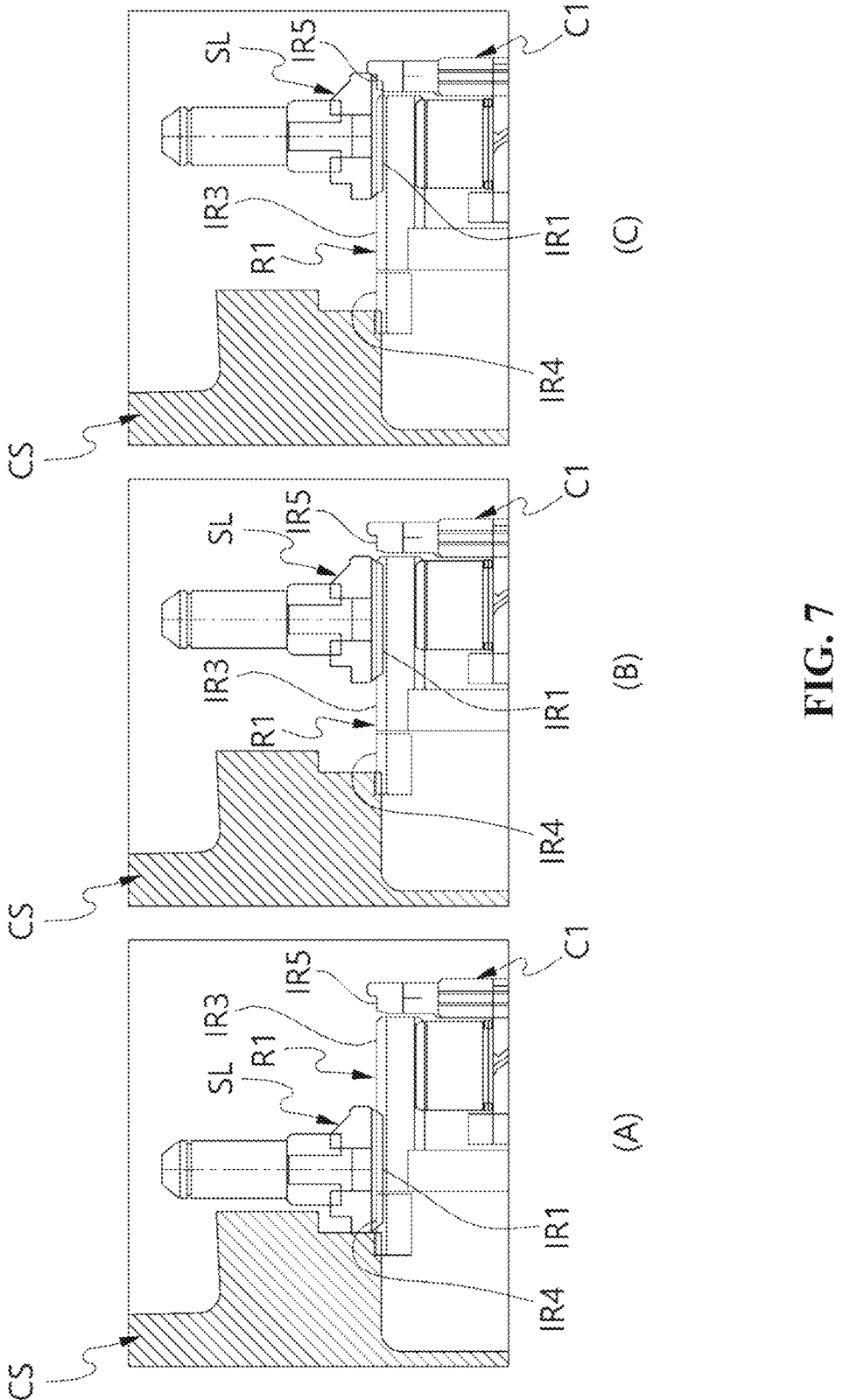
FIG. 7 is a view illustrating operations of a sleeve in a first shift position, an N-shift position, and a second shift position according to a third embodiment of the present disclosure.

FIG. 7 is a view illustrating operations of the sleeve in a first shift position, an N-shift position, and a second shift position according to a third embodiment of the present disclosure.

As illustrated in FIG. 7, the third embodiment of the present disclosure may be identical in configuration to the first embodiment, except for the engagement parts.

The fifth engagement part IR5 may be provided on the outer-diameter portion of the first carrier C1. The fourth engagement part IR4 may be provided in the casing CS.

The first engagement part IR1 and the fourth and fifth engagement parts IR4 and IR5 may have spline teeth of internal gears. The teeth of the first, fourth, and fifth engagement parts IR1, IR4, and IR5 may be formed at predetermined intervals and have quadrangular or trapezoidal shapes.

The fourth engagement part IR4 may have a shape or form that may be integrated with or separated from the casing CS.

Next, an operation of the first embodiment of the present disclosure during the first shift operation will be described.

As illustrated in FIGS. 1, 3A, 4, and 5, during the first shift operation, the sleeve SL may be moved in the first shift direction by the operation of the controller Control.

As the sleeve SL moves in the first shift direction, the second engagement part IR2 may engage with the fourth engagement part IR4 of the casing CS in the state in which the first engagement part IR1 engages with the third engagement part IR3 of the first ring gear R1.

The first engagement part IR1 of the sleeve SL may engage with the third engagement part IR3 of the first ring gear R1, and the second engagement part IR2 of the sleeve SL may engage with the fourth engagement part IR4 of the casing CS, such that the first ring gear R1 may be fixed.

In the fixed state of the first ring gear R1, the power of the drive motor MG may be transmitted to the first sun gear S1 via the input shaft IP.

The power transmitted to the first sun gear S1 may be transmitted to the first carrier C1 via the first sun gear S1 and the first planet gears P1.

Because the first carrier C1 and the second sun gear S2 are connected, the power transmitted to the first carrier C1 may be transmitted to the second carrier C2 and the second ring gear R2 via the second sun gear S2 and the second planet gears P2.

The power transmitted to the second carrier C2 may be transmitted to the inter-shaft IS. The power transmitted to the inter-shaft IS may be transmitted to one side driving wheel (not illustrated) via one side axle shaft (not illustrated).

The second ring gear R2 may serve as the ring gear of the second planetary gear set PS2 and serve as the sun gear of the third planetary gear set PS3. The power transmitted to the second ring gear R2 may be transmitted to the third ring gear R3 via the third planet gears P3. The third carrier C3 is fixed to the casing CS and cannot rotate.

The power transmitted to the third ring gear R3 may be transmitted to the other side driving wheel (not illustrated) via the other side axle shaft AS.

Next, an operation of the first embodiment of the present disclosure during the second shift operation will be described.

As illustrated in FIGS. 2, 3C, 4, and 5, during the second shift operation, the sleeve SL may be moved in the second shift direction by the operation of the controller Control.

As the sleeve SL moves in the second shift direction, the first engagement part IR1 may simultaneously engage with the fifth engagement part IR5 of the first carrier C1 in the state in which the first engagement part IR1 engages with the third engagement part IR3 of the first ring gear R1. At the same time, the second engagement part IR2 may disengage from the fourth engagement part IR4.

As the second engagement part IR2 disengages from the fourth engagement part IR4, the first ring gear R1 may rotate integrally with the first carrier C1.

In the unfixed state of the first ring gear R1, the power of the drive motor MG may be transmitted to the first sun gear S1 via the input shaft IP.

The power transmitted to the first sun gear S1 may be transmitted to the first carrier C1 via the first sun gear S1 and the first planet gears P1.

Because the first carrier C1 and the second sun gear S2 are connected, the power transmitted to the first carrier C1 may be transmitted to the second carrier C2 and the second ring gear R2 via the second sun gear S2 and the second planet gears P2.

The power transmitted to the second carrier C2 may be transmitted to the inter-shaft IS. The power transmitted to the inter-shaft IS may be transmitted to one side driving wheel (not illustrated) via one side axle shaft (not illustrated).

The second ring gear R2 may serve as the ring gear of the second planetary gear set PS2 and serve as the sun gear of the third planetary gear set PS3. The power transmitted to the second ring gear R2 may be transmitted to the third ring gear R3 via the third planet gears P3. The third carrier C3 is fixed to the casing CS and cannot rotate.

The power transmitted to the third ring gear R3 may be transmitted to the other side driving wheel (not illustrated) via the other side axle shaft AS.

Next, an operation of the second embodiment of the present disclosure during the first shift operation will be described.

As illustrated in FIG. 6A, during the first shift operation, when the sleeve SL moves in the first shift direction, the second engagement part IR2 may engage with the fourth engagement part IR4 provided in the casing CS while the first engagement part IR1 engages with the third engagement part IR3.

Next, an operation of the second embodiment of the present disclosure during the second shift operation will be described.

As illustrated in FIGS. 6B and 6C, during the second shift operation, when the sleeve SL moves in the second shift direction, the second engagement part IR2 may disengage from the fourth engagement part IR4 and the sixth engagement part IR6 may engage with the fifth engagement part IR5 while the first engagement part IR1 engages with the third engagement part IR3.

Meanwhile, the operation and the flow of power in the second embodiment of the present disclosure may be identical to those in the first embodiment.

Next, an operation of the third embodiment of the present disclosure during the first shift operation will be described.

As illustrated in FIG. 7A, during the first shift operation, when the sleeve SL moves in the first shift direction, the first engagement part IR1 may simultaneously engage with the fourth engagement part IR4 while engaging with the third engagement part IR3.

Next, an operation of the third embodiment of the present disclosure during the second shift operation will be described.

As illustrated in FIGS. 7B and 7C, when the sleeve SL moves in the second shift direction, the first engagement part IR1 may simultaneously engage with the fifth engagement part IR5 while engaging with the third engagement part IR3.

Meanwhile, the operation and the flow of power in the third embodiment of the present disclosure may be identical to those in the first embodiment.

As described above, according to the present disclosure, the speed reduction structure including the plurality of planetary gear sets may make it easy to mount the package of the vehicle. In addition, according to the present disclosure, the first and second shift operations may be performed, which may control a low-speed vehicle speed and a high-speed vehicle speed. In addition, according to the present disclosure, the plurality of planetary gear sets are provided, such that the plurality of planetary gear sets do not occupy a large space when being mounted in the vehicle. In addition, according to the present disclosure, the shift operation may be controlled by the operation of the sleeve. In addition, according to the present disclosure, the number of components may be reduced, such that costs and weight may be reduced, and the assembling process may be simplified, in comparison with a power train device for an electric vehicle in the related art. In addition, according to the present disclosure, the module structure including the first planetary gear set, the second planetary gear set, and the third planetary gear set may be applied to both the central motor type and the electric axle (E-axle) type.

The above description is simply given for illustratively describing the technical spirit of the present disclosure, and those skilled in the art to which the present disclosure pertains will appreciate that various modifications, changes, and substitutions are possible without departing from the essential characteristics of the present disclosure. Accordingly, the embodiments disclosed in the present disclosure and the accompanying drawings are intended not to limit but to describe the technical spirit of the present disclosure, and the scope of the technical spirit of the present disclosure is not limited by the embodiments and the accompanying drawings. The protective scope of the present disclosure should be construed based on the following claims, and all the technical spirit in the equivalent scope thereto should be construed as falling within the scope of the present disclosure.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

DESCRIPTION OF REFERENCE NUMERALS

PS1: First planetary gear set
C1: First carrier
P1: First planet gear
R1: First ring gear
S1: First sun gear
PS2: Second planetary gear set
C2: Second carrier
P2: Second planet gear
R2: Second ring gear
S2: Second sun gear
PS3: Third planetary gear set
C3: Third carrier
P3: Third planet gear
R3: Third ring gear
SL: Sleeve
IR1: First engagement part
IR2: Second engagement part
IR3: Third engagement part
IR4: Fourth engagement part
IR5: Fifth engagement part
IR6: Sixth engagement part
CS: Casing
IS: Inter-shaft
AS: The other side axle shaft
MG: Drive motor
ST: Stator
RT: Rotor
IP: Input shaft
INV: Inverter
Control: Controller

What is claimed is:
1. A power train device for an electric vehicle, the power train device comprising:
a first planetary gear set comprising a first sun gear coupled to an input shaft connected to a drive motor, a first ring gear surrounding the first sun gear, a first planet gear configured to engage with the first sun gear and the first ring gear between the first sun gear and the first ring gear, and a first carrier configured to support the first planet gear so that the first planet gear is rotatable; and a sleeve having an inner-diameter portion having a first engagement part thereon, the first engagement part being configured to:

engage with a third engagement part disposed on an outer-diameter portion of the first ring gear;

move along an axial direction of the input shaft while engaging with the third engagement part toward a casing to implement a first shift operation for a first speed range; and move along the axial direction of the input shaft while engaging with the third engagement part toward the first carrier to implement a second shift operation for a second speed range, wherein a second engagement part is disposed on one surface of the sleeve, a fourth engagement part is disposed in the casing, a fifth engagement part is disposed on one surface of the first carrier, and a sixth engagement part is disposed on another surface of the sleeve facing the fifth engagement part, wherein the second engagement part and the fourth engagement part have first radial dog- type teeth facing one another, and the fifth engagement part and the sixth engagement part have second radial dog-type teeth facing one another.

2. The power train device of claim 1, wherein during the first shift operation, the sleeve is configured to move in a first shift direction, such that the second engagement part engages with the fourth engagement part in the casing while the first engagement part engages with the third engagement part.

3. The power train device of claim 2, wherein during the second shift operation, the sleeve is configured to move in a second shift direction, such that the second engagement part disengages from the fourth engagement part and the sixth engagement part engages with the fifth engagement part while the first engagement part engages with the third engagement part.

4. The power train device of claim 2, wherein the first engagement part and the third engagement part have spline teeth of internal gears.

*   *   *   *   *